(12) United States Patent
Wetterwald et al.

(10) Patent No.: US 9,258,097 B2
(45) Date of Patent: Feb. 9, 2016

(54) CONFIGURING NEW PATHS IN A WIRELESS DETERMINISTIC NETWORK

(71) Applicants: Patrick Wetterwald, Mouans Sartoux (FR); Jean-Philippe Vasseur, Saint Martin d'Uriage (FR); Pascal Thubert, La Colle sur Loup (FR)

(72) Inventors: Patrick Wetterwald, Mouans Sartoux (FR); Jean-Philippe Vasseur, Saint Martin d'Uriage (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 13/954,297

(22) Filed: Jul. 30, 2013

(65) Prior Publication Data
US 2015/0023325 A1  Jan. 22, 2015

Related U.S. Application Data

(60) Provisional application No. 61/856,688, filed on Jul. 20, 2013.

(51) Int. Cl.
*H04L 5/00* (2006.01)
*H04L 12/721* (2013.01)
*H04L 12/717* (2013.01)

(52) U.S. Cl.
CPC ............. *H04L 5/0055* (2013.01); *H04L 45/34* (2013.01); *H04L 45/42* (2013.01)

(58) Field of Classification Search
None
See application file for complete search history.

(56) References Cited

U.S. PATENT DOCUMENTS

| | | | |
|---|---|---|---|
| 6,963,926 B1 * | 11/2005 | Robinson | 709/239 |
| 8,363,662 B2 | 1/2013 | Thubert et al. | |
| 8,396,022 B1 | 3/2013 | Lindsay et al. | |
| 8,447,849 B2 | 5/2013 | Shaffer et al. | |
| 8,451,744 B2 | 5/2013 | Vasseur | |
| 8,489,765 B2 | 7/2013 | Vasseur et al. | |
| 8,630,177 B2 | 1/2014 | Vasseur et al. | |
| 8,817,665 B2 | 8/2014 | Thubert et al. | |
| 8,830,847 B1 * | 9/2014 | Doherty et al. | 370/252 |

(Continued)

FOREIGN PATENT DOCUMENTS

WO 2014/058936 A1 4/2014

OTHER PUBLICATIONS

Awduche et al., "RSVP-TE: Extensions to RSVP for LSP Tunnels," RFC 3209, Dec. 2001, The Internet Society, Reston, VA (sixty-one pages).

(Continued)

*Primary Examiner* — Hicham Foud
(74) *Attorney, Agent, or Firm* — The Law Office of Kirk D. Williams

(57) ABSTRACT

In one embodiment, a first node in a wireless deterministic network communicates to a second node configuration information identifying a destination-facing path portion of a particular one-way path traversing from a source node to a destination node within the wireless deterministic network. The destination-facing portion includes a path traversing from the second node over one or more additional nodes to the destination node over which to forward packets received over a first portion of the particular one-way path from the source node to the second node. The configuration information includes a particular time slot for the second node to receive packets being sent over the particular one-way path. In one embodiment, the first node receives from the second node an acknowledgement message in the particular time slot that the destination-facing portion of the particular one-way path was configured and activated.

19 Claims, 8 Drawing Sheets

(56) References Cited

U.S. PATENT DOCUMENTS

| | | | |
|---|---|---|---|
| 2003/0177263 A1* | 9/2003 | Robinson | 709/239 |
| 2005/0091358 A1* | 4/2005 | Mehra et al. | 709/223 |
| 2008/0123682 A1 | 5/2008 | Yackoski et al. | |
| 2008/0222478 A1 | 9/2008 | Tamaki | |
| 2009/0034419 A1* | 2/2009 | Flammer et al. | 370/238 |
| 2011/0216656 A1 | 9/2011 | Pratt, Jr. et al. | |
| 2012/0155329 A1 | 6/2012 | Shaffer et al. | |
| 2012/0300668 A1 | 11/2012 | Thubert et al. | |
| 2012/0307629 A1* | 12/2012 | Vasseur et al. | 370/228 |
| 2014/0006893 A1 | 1/2014 | Shetty et al. | |
| 2014/0233422 A1 | 8/2014 | Thubert et al. | |

OTHER PUBLICATIONS

Winter et al., "RPL: IPv6 Routing Protocol for Low-Power and Lossy Networks," RFC 6550, Mar. 2012, The Internet Society, Reston, VA, USA (157 pages).

Goyal et al., "Reactive Discovery of Point-to-Point Routes in Low-Power and Lossy Networks," RFC 6997, Aug. 2013, The Internet Society, Reston, VA, USA (forty pages).

Thubert et al, "Available Routing Constructs," draft-thubert-rtgwg-arc-00, Oct. 2, 2012, The Internet Society, Reston, VA, USA (nineteen pages).

Thubert et al, "Applying Available Routing Constructs to bicasting," draft-thubert-rtgwg-arc-bicast-00, Oct. 11, 2012, The Internet Society, Reston, VA, USA (ten pages).

"Media Access Control (MAC) Bridges and Virtual Bridge Local Area Networks," IEEE Std 802.1Q™-2011, Aug. 31, 2011, IEEE Computer Society, IEEE, New York, NY (one thousand three hundred sixty-five pages).

Braden et al., "Resource ReSerVation Protocol (RSVP)—Version 1 Functional Specification," RFC 2205, Sep. 1997, The Internet Society, Reston, VA, USA (112 pages).

Le Faucheur, Resource Reservation Protocol (RSVP) Extensions for Path-Triggered RSVP Receiver Proxy, RFC 5946, Oct. 2010, The Internet Society, Reston, VA, USA (thirty-five pages).

"Part 15.4: Low-Rate Wireless Personal Area Networks (LR-WPANs) Amendment 1: MAC sublayer," IEEE Std 802.15.4e™-2012, Apr. 16, 2012, IEEE Computer Society, IEEE, New York, NY (two hundred twenty-five pages).

Vasseur et al., "Path Computation Element (PCE) Communication Protocol (PCEP)," RFC 5440, Mar. 2009, The Internet Society, Reston, VA, USA (eighty-seven pages).

Wang et al., "6tus Layer Specification," draft-wang-6tsch-6tus-01, May 23, 2013, The Internet Society, Reston, VA, USA (fifty-six pages).

Yasukawa et al., "Operations and Management (OAM) Requirements for Point-to-Multipoint MPLS Networks," RFC 4687, Sep. 2006, The Internet Society, Reston, VA, USA (fourteen pages).

Bocci et al., "A Framework for MPLS in Transport Networks," RFC 5921, Jul. 2010, The Internet Society, Reston, VA, USA (fifty-six pages).

Atlas et al., "An Architecture for IP/LDP Fast-Reroute Using Maximally Redundant Trees," draft-ietf-rtgwg-mrt-frr-architecture-03, Jul. 12, 2013, The Internet Society, Reston, VA, USA (twenty-nine pages).

Ripphausen-Lipa et al., "The Vertex-Disjoint Menger Problem in Planar Graphs," SODA '93 Proceedings of the Fourth Annual ACM-SIAM Symposium on Discrete Algorithms, Society for Industrial and Applied Mathematics, Philadelphia, PA, 1993 (eight pages).

Thubert et al., "IETF 6TSCH: Combining IPv6 Connectivity with Industrial Performance," 2013 Seventh International Conference on Innovative Mobile and Internet Services in Ubiquitous Computing (IMIS), IEEE, New York, NY, Jul. 2013 (six pages).

"Deterministic Ethernet, IEEE 802.1 standards for real-time process control, industrial automation, and vehicular networks," available at http://www.ieee802.org/802_tutorials/2012-11/8021-tutorial-final-v4.pdf, Nov. 12, 2012, IEEE, New York, NY (seventy-two pages).

Watteyne et al., "Using IEEE802.15.4e TSCH in an LLN context: Overview, Problem Statement and Goals," draft-watteyne-6tsch-tsch-lln-context-02, May 23, 2013, The Internet Society, Reston, VA (twenty-three pages).

Farrel et al., "A Path Computation Element (PCE)-Based Architecture," RFC 4655, The Internet Society, Reston, VA, (forty pages).

PCT International Search Report and Written Opinion, PCT Application PCT/US2014/044451, ISA/EP, European Patent Office, Netherlands, mailed Oct. 29, 2014 (fourteen pages).

Thubert et al., "An Architecture for IPv6 over Timeslotted Channel Hopping," draft-thubert-6tsch-architecture-02, Jul. 15, 2013, The Internet Society, Reston, VA, USA (seventeen pages).

Thubert et al., "IETF 6TSCH: Combining IPv6 Connectivity with Industrial Performance," 2013 Seventh International Conference on Innovative Mobile and Internet Services in Ubiquitous Computing, Jul. 2013, IEEE, Taichung, Taiwan, pp. 541-546.

Wang et al., "Transmission Scheduling of IPv6 Packets over IEEE 802.15.4 Networks-Extension for Industrial Application Space," draft-wang-6lowpan-scheduling-00.txt, Apr. 20, 2012, The Internet Society, Reston, VA, USA (fifteen pages).

Palattella et al., "Terminology in IPv6 over Time Slotted Channel Hopping," draft-palattella-6tsch-terminology-00, Mar. 10, 2013, The Internet Society, Reston, VA, USA (eight pages).

Wang et al., "A Routing Algorithm for Industrial Wireless Network Based on Deterministic Scheduling," Fourth International Conference on Machine Vision (ICMV 2011 ): Machine Vision, Image Processing, and Pattern Analysis, Proc. of SPIE, vol. 8349,No. 1, Dec. 24, 2011, Bellingham, WA (eight pages).

Wang et al., "The Follow Data Stream Synchronization Protocol for Deterministic Wireless Sensor Networks," Information Computing and Telecommunications (YC-ICT), 2010 IEEE Youth Conference on, IEEE, Nov. 28, 2010, pp. 315-318.

\* cited by examiner

CONFIGURING NEW PATHS IN A WIRELESS DETERMINISTIC NETWORK

CROSS-REFERENCE TO RELATED APPLICATIONS

This application claims the benefit of U.S. Provisional Application No. 61/856,688, filed Jul. 20, 2013, which is hereby incorporated by reference in its entirety.

TECHNICAL FIELD

The present disclosure relates generally to forwarding packets in a communications network, including, but not limited to, a wireless deterministic network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Deterministic networks rely on a set of predetermined time slots, which define at least a time (and possibly frequency to use especially in a wireless deterministic network), when each specific node can communicate a packet to a second specific node in the deterministic network.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
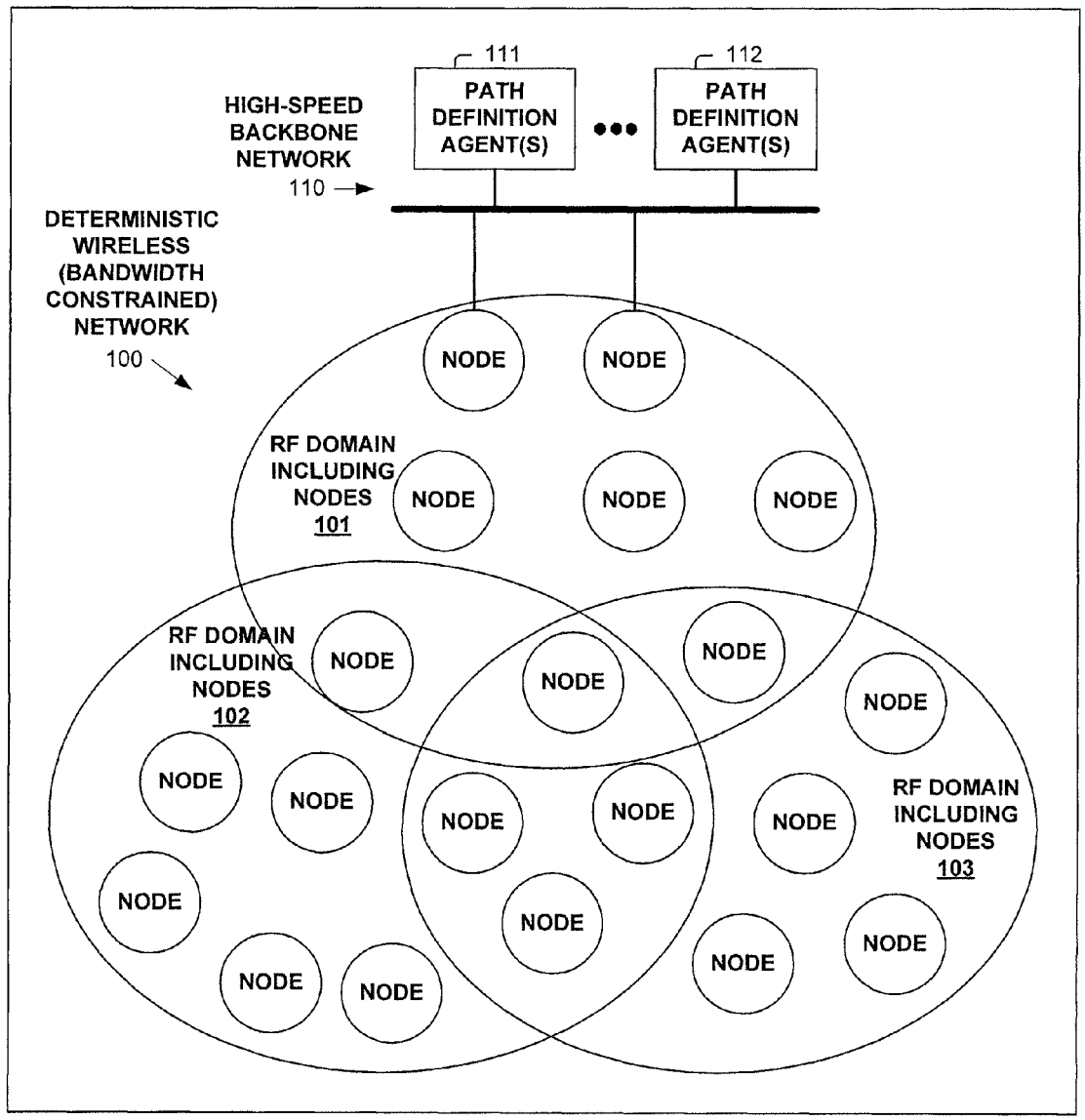
FIG. 1A illustrates a network operating according to one embodiment.

Disclosed are, inter alia, methods, apparatus, computer-storage media, mechanisms, and means associated with configuring new paths in a wireless deterministic network. In one embodiment, a first node in a wireless deterministic network communicates to a second node configuration information identifying a destination-facing path portion of a particular one-way path traversing from a source node to a destination node within the wireless deterministic network. The destination-facing portion includes a path traversing from the second node over one or more additional nodes to the destination node over which to forward packets received over a first portion of the particular one-way path from the source node to the second node. The configuration information includes a particular time slot for the second node to receive packets being sent over the particular one-way path.

In one embodiment, the first node receives from the second node an acknowledgement message in the particular time slot that the destination-facing portion of the particular one-way path was configured and activated. In one embodiment, said configuration information was determined by a path definition agent and communicated to the first node by going through nodes of the first portion of the particular one-way path from the source node to the first node.

In one embodiment, in response to not receiving by the first node from the second node an acknowledgement message or receiving an error message, the first node communicates to the path definition agent a notification of the failure to install and activate the destination-facing portion of the particular one-way path. In one embodiment, the first node receives new configuration information identifying a new destination-facing portion for reaching the destination node, with the new destination-facing portion including a path traversing from a third node to the destination node without traversing the second node over which to forward packets received over the first portion of the particular one-way path, and with said new configuration information including a new particular time slot for the third node to receive packets being sent over the particular one-way path. In one embodiment, the first node receives from the third node an acknowledgement message in the new particular time slot that the new destination-facing portion of the particular one-way path was configured and activated.

2. Description

Disclosed are, inter alia, methods, apparatus, computer-storage media, mechanisms, and means associated with configuring new paths in a wireless deterministic network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes a method, comprising: communicating, by a first node in a wireless deteiministic network to a second node in the wireless deterministic network, configuration information identifying a destination-facing path portion of a particular one-way path traversing from a source node to a destination node within the wireless deterministic network, with the destination-facing portion including a path traversing from the second node over one or more additional nodes to the destination node over which to forward packets received over a first portion of the particular one-way path from the source node to the second node, and with said configuration information including a particular time slot for the second node to receive packets being sent over the particular one-way path; and receiving, by the first node from the second node, an acknowledgement message in the particular time slot that the destination-facing portion of the particular one-way path was configured and activated.

In one embodiment, said configuration information includes a particular frequency for the second node to receive packets being sent over the particular one-way path; and wherein the first node said receives the acknowledgement message on the particular frequency. One embodiment includes: listening, by the first node after waiting a nonzero predetermined wait time after the beginning of the particular time slot that allows the second node to communicate with the first node if the first node does not send information during the nonzero predetermined wait time, for the acknowledgement message. In one embodiment, said configuration information includes time slot allocation information for communicating among nodes in the destination-facing path. In one embodiment, said configuration information includes frequency allocation information for communicating among nodes in the destination-facing path. In one embodiment, said configuration information was determined by a path definition agent and communicated to the first node by going through nodes of the first portion of the particular one-way path from the source node to the first node.

One embodiment includes: receiving, by the first node from a prior node in the first portion of the particular one-way path a specific time slot for the first node to receive packets being sent over the particular one-way path; and installing, by the first node, the specific time slot for receiving packets being sent over the particular one-way path. One embodiment includes: activating, by the first node in response to said receiving the acknowledgement message, forwarding information for forwarding packets to the second node over the particular one-way path. In one embodiment, said configuration information was determined by a path definition agent and communicated to the first node by going through nodes of the first portion of the particular one-way path from the source node to the first node.

One embodiment includes: listening, by the first node after waiting a nonzero predetermined wait time after the beginning of the particular time slot that allows the second node to communicate with the first node if the first node does not send information during the nonzero predetermined wait time, for the acknowledgement message.

One embodiment includes a method, comprising: communicating, by a first node in a wireless deterministic network to a second node in the wireless deterministic network, configuration information identifying a destination-facing path portion of a particular one-way path traversing from a source node to a destination node within the wireless deterministic network, with the destination-facing portion including a path traversing from the second node to the destination node over which to forward packets received over a first portion of the particular one-way path from the source node to the second node, and with said configuration information including a particular time slot for the second node to receive packets being sent over the particular one-way path; and wherein said configuration information was determined by a path definition agent and communicated to the first node by going through nodes of the first portion of the particular one-way path from the source node to the first node; and in response to not receiving by the first node from the second node an acknowledgement message or receiving an error message, the first node communicating to the path definition agent a notification of the failure to install and activate the destination-facing portion of the particular one-way path.

One embodiment includes: receiving, by the first node, new configuration information identifying a new destination-facing portion for reaching the destination node, with the new destination-facing portion including a path traversing from a third node to the destination node without traversing the second node over which to forward packets received over the first portion of the particular one-way path, and with said new configuration information including a new particular time slot for the third node to receive packets being sent over the particular one-way path; and receiving, by the first node from the third node, an acknowledgement message in the new particular time slot that the new destination-facing portion of the particular one-way path was configured and activated.

One embodiment includes: receiving, by the first node from a prior node in the first portion of the particular one-way path a specific time slot for the first node to receive packets being sent over the particular one-way path; and installing, by the first node, the specific time slot for receiving packets being sent over the particular one-way path. One embodiment includes: uninstalling, by the first node, the specific time slot for receiving packets being sent over the particular one-way path in response to the path definition agent determining a new one-way path traversing from the source node to the destination node within the wireless deterministic network over one or more nodes in the first portion but not including the first node.

One embodiment includes a first node, comprising: one or more processing elements; memory; one or more wireless interfaces configured to send and receive packets; and wherein the first node is configured to communicate with a second node in a wireless deterministic network, including communicating configuration information identifying a destination-facing path portion of a particular one-way path traversing from a source node to a destination node within the wireless deterministic network, with the destination-facing portion including a path traversing from the second node to the destination node over which to forward packets received over a first portion of the particular one-way path from the source node to the second node, and with said configuration information including a particular time slot for the second node to receive packets being sent over the particular one-way path; and wherein the first node is configured to receive from the second node an acknowledgement message in the particular time slot that the destination-facing portion of the particular one-way path was configured and activated.

In one embodiment, said configuration information includes a particular frequency for the second node to receive packets being sent over the particular one-way path; and wherein the first node said receives the acknowledgement message on the particular frequency. In one embodiment, the first node is configured to listen after waiting a nonzero predetermined wait time after the beginning of the particular time slot that allows the second node to communicate with the first node if the first node does not send information during the nonzero predetermined wait time, for the acknowledgement message. In one embodiment, said configuration information includes time slot allocation information for communicating among nodes in the destination-facing path. In one embodiment, said configuration information was determined by a path definition agent and communicated to the first node by going through nodes of the first portion of the particular one-way path from the source node to the first node. In one embodiment, the first node is configured to: receive from a prior node in the first portion of the particular one-way path a specific time slot for the first node to receive packets being sent over the particular one-way path, and to install the specific time slot for receiving packets being sent over the particular one-way path.

Expressly turning to the figures, FIG. 1A illustrates a network 100 (e.g., deterministic wireless network, which is bandwidth constrained) operating according to one embodiment. As shown, network 100 includes a high-speed (e.g., Ethernet) backbone network including one or more path definition agents 111-112. Deterministic wireless network 100 includes three overlapping different radio frequency (RF) domains 101, 102 and 103, each containing a plurality of nodes as shown in FIG. 1A. Note, typically and not shown, each of these network nodes (e.g., when a node operates as a bridge or router) is connected to a network of devices and/or directly connected to one or more devices.

Figure 1B:
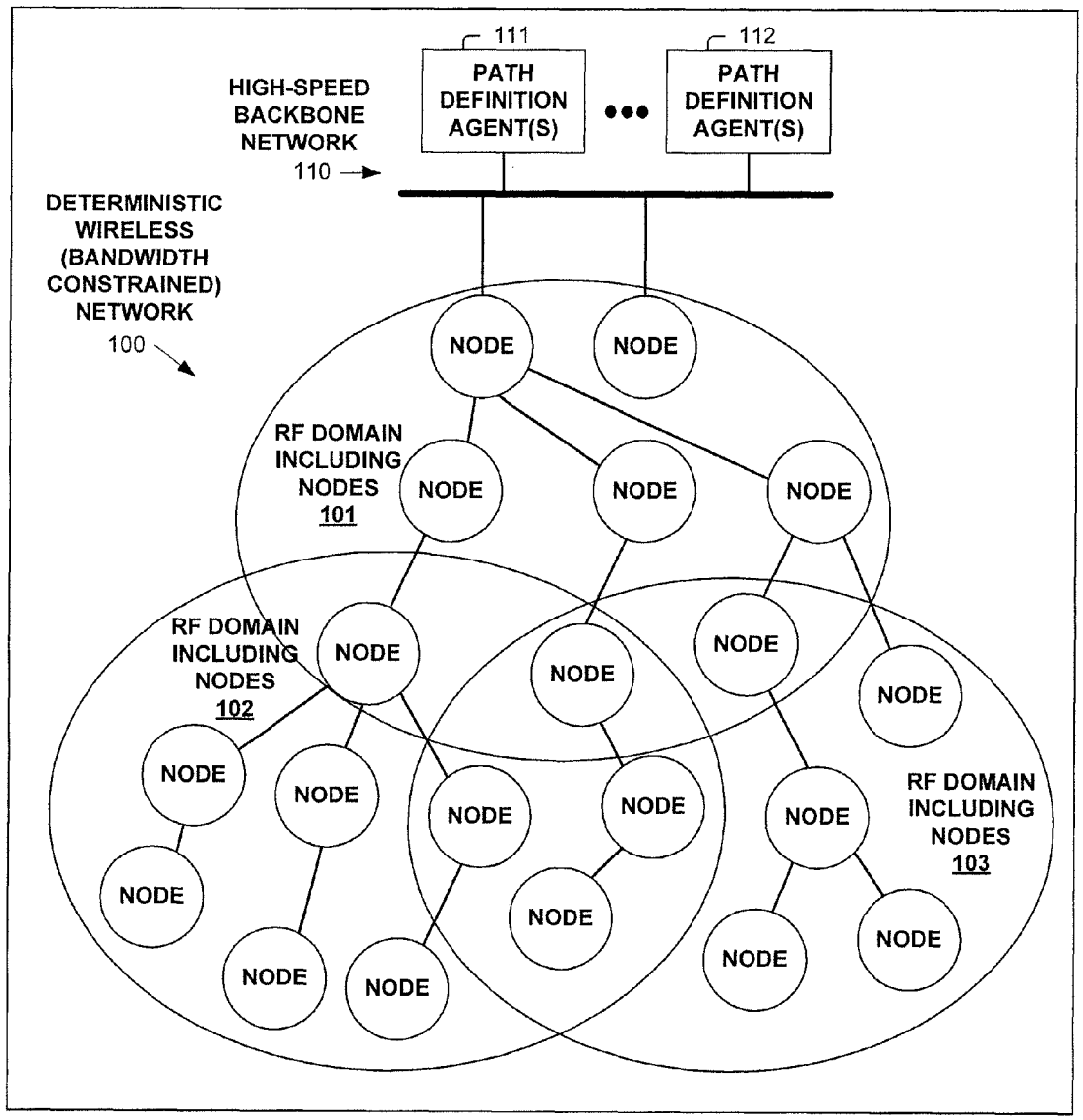
FIG. 1B illustrates a network operating according to one embodiment.

FIG. 1B illustrates the communication links established between nodes in RF domains 101, 102 and 103 to provide access to one or more path definition agents 111-112. In one embodiment, a communications path for transmitting packets between first and second nodes may traverse any set of nodes, and is not limited to one or more of the paths shown in FIG. 1B.

Figure 1C:
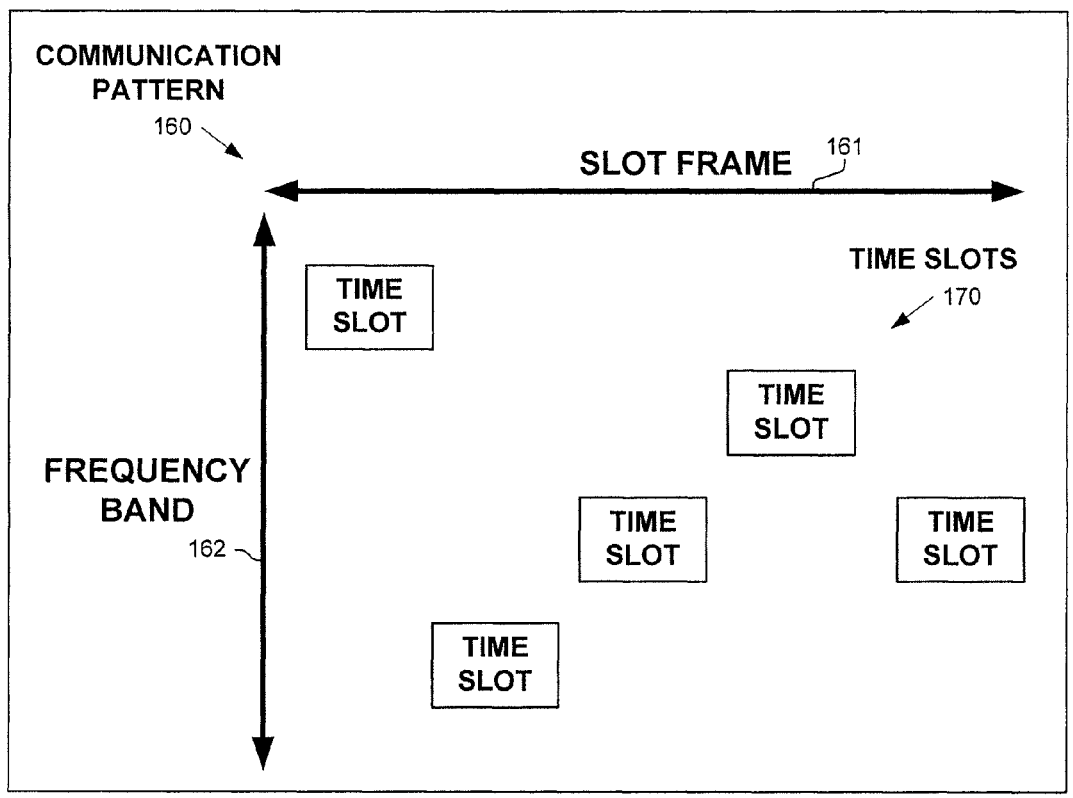
FIG. 1C illustrates a communication pattern operating according to one embodiment.

In one embodiment in a deterministic network, a node communicates information (e.g., a packet) to a second node in a time slot (170) as illustrated by communication pattern 160 as shown in FIG. 1C. A slot frame 161 is a period of time divided into multiple time slots 170. Also, there is a second dimension, that the frequency (162) used for a particular time slot 170. Thus, in one embodiment, a time slot (170) is associated with a particular time (e.g., of a slot frame 170) and a particular frequency (e.g. of a frequency band 162).

In one embodiment, a path definition agent (111-112 of FIGS. 1A, 1B) computes a desired complete path (e.g., physical nodes, time slot(s) schedule, frequencies, a unique path identifier (path ID)). Typically, there are multiple time slots (at same or different frequencies) allocated between each pair of nodes of the path as certain operating environments cause substantial packet loss. Therefore in one embodiment, multiple time slots are allocated, including time slots for retransmission in case it is needed. In one embodiment, after a packet is successfully communicated during a time slot, the remaining time slot(s) go unused or repurposed for communicating other information.

This configuration information is sent to source node (e.g., the one that is going to be initially sending the information through the network, and is typically the node requesting the new path from the orchestrator, path computation engine, network management system, or other system). The source node uses this computed path identify the first hop node (e.g., the next node in the path from the source node) in the computed path, to which the path programming information is sent. One embodiment accomplishes this using a shared time slot (e.g., of the 802.15.4 MAC), piggybacks this information in a packet being communicated to the first hop node (e.g., if the source has already a time slot and path for communicating with this first hop node).

Next, in one embodiment, the first hop node will install in its internal forwarding table, the received information (including associated timeslot) related to the new path for communicating (e.g., including receiving information from the source node). The first hop node will also install the path (including associated timeslot) to the second (next) hop along the path being installed in the network. The first hop will not enable the forwarding for this path at this time. The first hop also maintains the addresses of the source and the next hop.

Next, in one embodiment, the first hop then will remove the information of the first hop path from the complete path received from the orchestrator, path computation engine, network management system, or other system. This information is removed to reduce the amount of information communicated in the network. The remaining path information is communicated from the first hop to the second hop.

Next, the second and successive hops will repeat this process performed by the first hop, but for the corresponding segment of the path being installed in the network. In one embodiment, each time this information reaches a hop it decreases in size as only the information to the remaining path is kept.

In one embodiment, when the path configuration information reaches the destination, the only remaining information is the time slot (e.g., including frequency) used for receiving a packet from the previous hop and the path ID. This time slot is that over which the destination node will listen for receiving a packet from the previous node in the path being installed in the network.

In one embodiment and in response to installing the path information, the destination node sends an acknowledgment message (including the path ID) back to the source node in the reverse direction along the newly installed path. This acknowledgement message with the included path ID informs all the nodes along the path that the path reached the destination.

In one embodiment, when a node receives the acknowledgement message with the included path ID), the node enables the forwarding for this path ID. In one embodiment, the node also removes the information (e.g., address) of the predecessor and next hop and only keeps the time slot and frequency information. When the source receives the acknowledgement message with the included path ID, the source node activates its forwarding information for the newly installed path, and starts sending data packets over the path.

In one embodiment, when a path is no more needed, the source could piggybacks a command to remove this path (thus freeing up timeslots) in a data packet being sent to the destination, which will be interpreted by each node along the path to tear down the path (e.g., remove receiving and forwarding information associated to it).

Figure 2A:
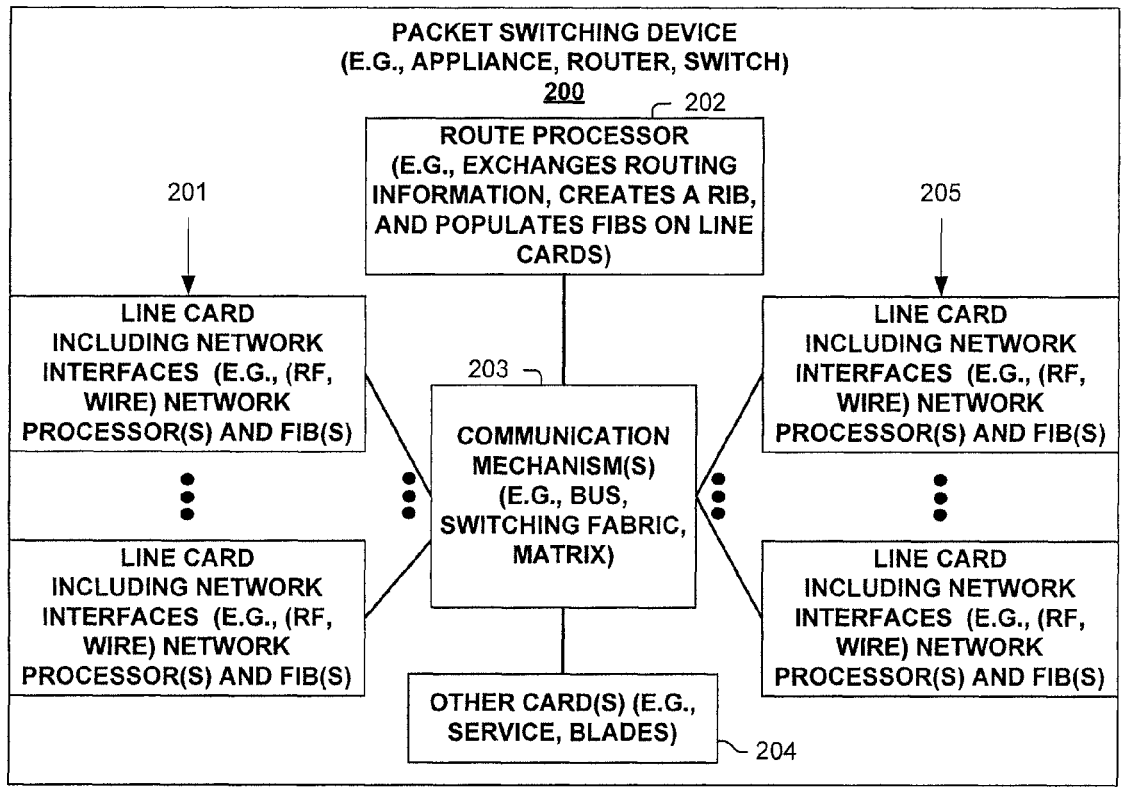
FIG. 2A illustrates a packet switching device according to one embodiment.

One embodiment of a packet switching device 200 (e.g., one example of a network node) is illustrated in FIG. 2A. As shown, packet switching device 200 includes multiple line cards 201 and 205, each with one or more network interfaces for sending and receiving packets over communications links, and with one or more processing elements that are used in one embodiment associated with configuring new paths in a wireless deterministic network. Packet switching device 200 also has a control plane with one or more processing elements 202 for managing the control plane and/or control plane processing of packets associated with configuring new paths in a wireless deterministic network. Packet switching device 200 also includes other cards 204 (e.g., service cards, blades) which include processing elements that are used in one embodiment to process packets associated with configuring new paths in a wireless deterministic network, and some communication mechanism 203 (e.g., bus, switching fabric, matrix) for allowing its different entities 201, 202, 204 and 205 to communicate.

Figure 2B:
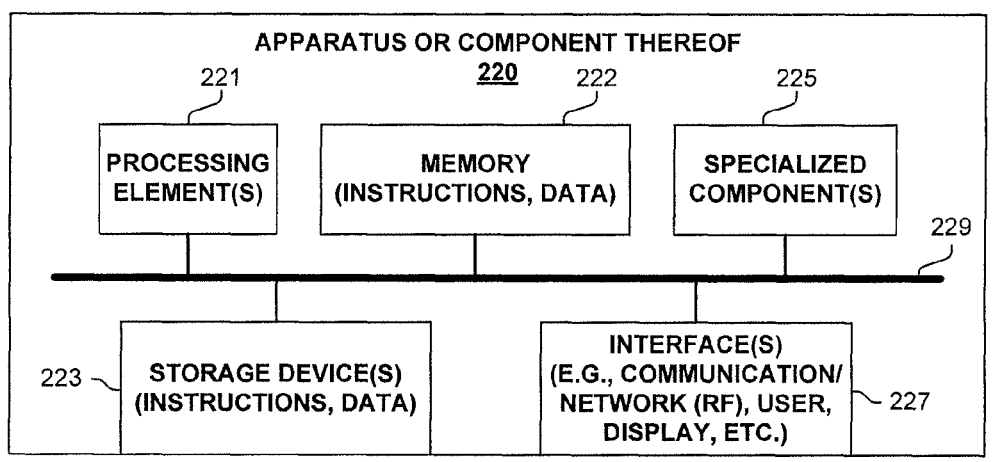
FIG. 2B illustrates an apparatus according to one embodiment.

FIG. 2B is a block diagram of an apparatus 220 used in one embodiment associated with configuring new paths in a wireless deterministic network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

In one embodiment, one or more path determination agents (e.g., an orchestrator, path computation engine, network management system, other system) performs computation of the path through the network and the associated timetable. A "path" refers to the path through the network between physical nodes and the timetable associated to each flow. In one embodiment, a path may also include one or more associated frequencies to use and/or other characteristics. When the computation is done, the path and the time table is then programmed in every node participating to the forwarding. The nodes then send and receive packets according to the schedule.

In the case of Deterministic Wireless, many systems used channel-hopping functionality. The timetable in this embodiment defines the time slot and the frequency channel. One embodiment uses the 802.15.4 specific extension to the standard has been defined: 802.15.4e TSCH. At its core is a medium access technique, which uses time synchronization to achieve ultra low-power operation and channel hopping to enable high reliability.

In one embodiment, Low Power Lossy Networks (such as wireless) uses different techniques (e.g., path diversity with DAG graphs and duocast, frequency diversity with channel hopping, time diversity with time slots are retries, and code diversity with DSSS and CDMA). In one embodiment, these are all used together in order to avoid interferences, which often occurs mostly in the ISM bands and limits the effects of multipath, which can be even more dramatic and are always present indoors. Both Retries imply a Poisson distribution of the arrival time, which translates either in jitter or a higher constant latency that will be a factor of the acceptable loss.

One embodiment installs new paths in a network. For example, when a source A requests, from a path definition agent, a path to a destination B in a wireless deterministic network (e.g., 802.15.4e TSCH). The path is computed by the path definition agent according to the communications constraints of the path (e.g., latency, energy . . . ). Then, the path is installed in all nodes participating to it with the associated time slots. It is typically too costly in bandwidth and energy to have the path definition agent talk to each individual node along the path. Therefore, one embodiment uses a progressive approach to program corresponding nodes of the new path.

Figure 3:
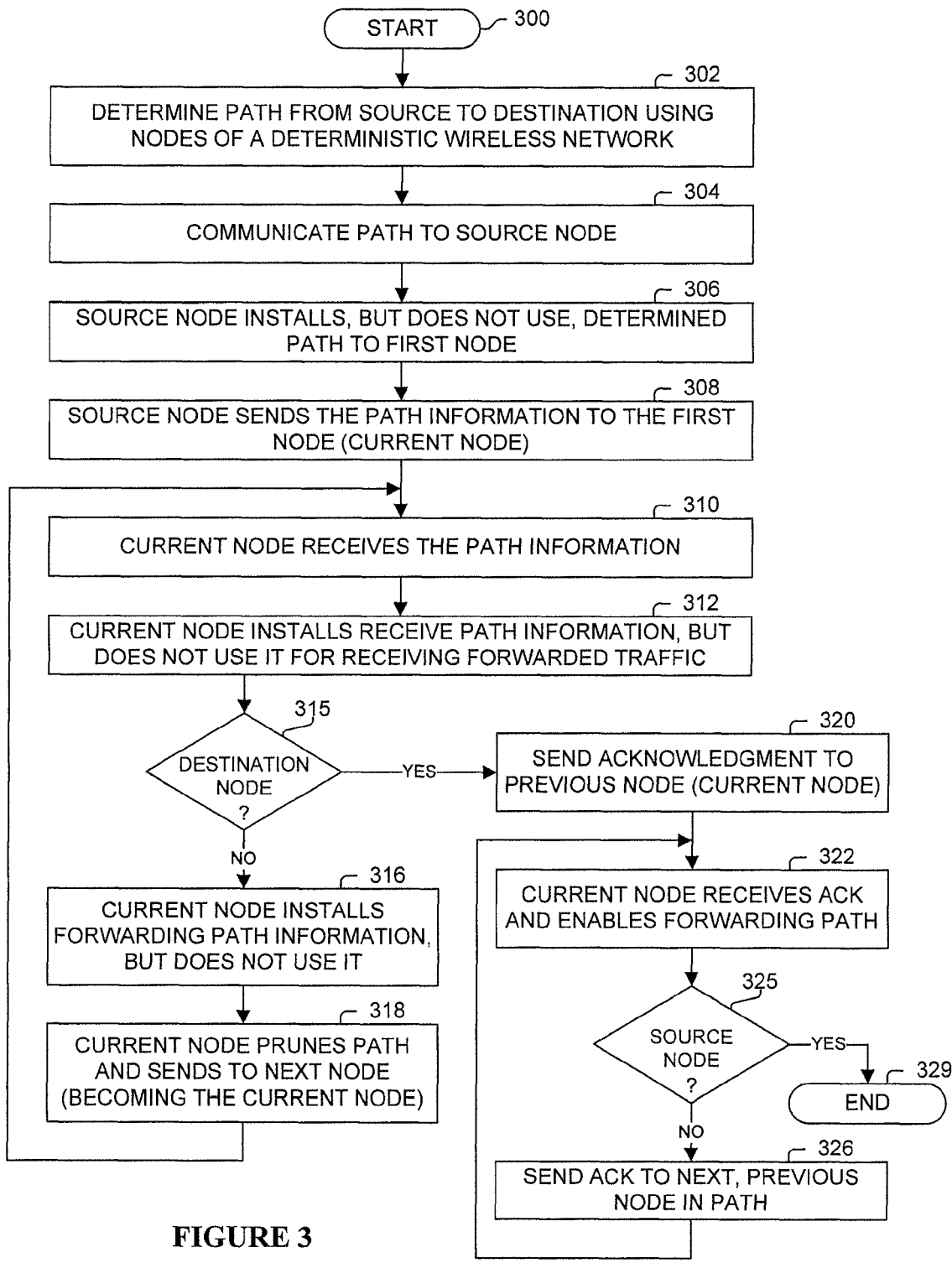
FIG. 3 illustrates a process according to one embodiment.

FIG. 3 illustrates a process performed in one embodiment in a deterministic network (e.g., wireless deterministic network). Processing begins with process block 300. In process block 302, the complete path (e.g., physical nodes, time slot(s) schedule, frequencies, path ID) from a source to a destination is computed (e.g., by a path definition agent). In process block 304, this information is sent to source node (e.g., the one that is going to be initially sending the information through the network, and is typically the node requesting the new path from the path definition agent(s)). In process block 306, the source node installs, but does not use (e.g., puts in its forwarding data structures by marked as not currently not usable), the determined path to the first hop node. In process block 308, the source node sends this computed path to the first hop node. One embodiment accomplishes this using a shared time slot (e.g., of the 802.15.4 MAC), piggybacks this information in a packet being communicated to the first hop node (e.g., if the source has already a time slot and path for communicating with this first hop node).

Processing of the flow diagram loops from process blocks 310-318 until the destination node is reached. "Current node" refers to a next node that receives the path information, as in process block 310, where the current node receives the path information (e.g., from the source node, or a previous node along the path). In process block 312, the current node installs the receive path information, but does not use it for receiving traffic. In one embodiment, the receive path information refers to one or more time slots and possibly frequencies on which the node should listen for receiving the packet or other information from a previous node of the path being installed in the deterministic network.

As determined in process block 315, if the current node is not the destination node, then processing proceeds to process block 316. In process block 316, the current node installs the forwarding information to the next node in the path, but does not use it. In process block 318, the current node prunes the path to remove its portion of the path (so as to reduce the amount of path information communicated to a next node), and sends the pruned path to the next node in the path. Processing returns to process block 310.

Otherwise, as determined in process block 315, if the current node is the destination node, then processing proceeds to process block 320. In process block 320, the destination node sends an acknowledgement message to a previous node (which becomes the current node) for looping purposes of process blocks 322-326. In process block 322, the current node receives the acknowledgement from the destination or previous node in the reverse direction through the path. As determined in process block 322, if the current node is the source node, then processing of the flow diagram of FIG. 3 is complete as indicated by process block 329. Otherwise, the current node is not the source node, and the current node sends an acknowledgement message to the next node in the reverse direction through the path; and processing returns to process block 322.

Figure 4:
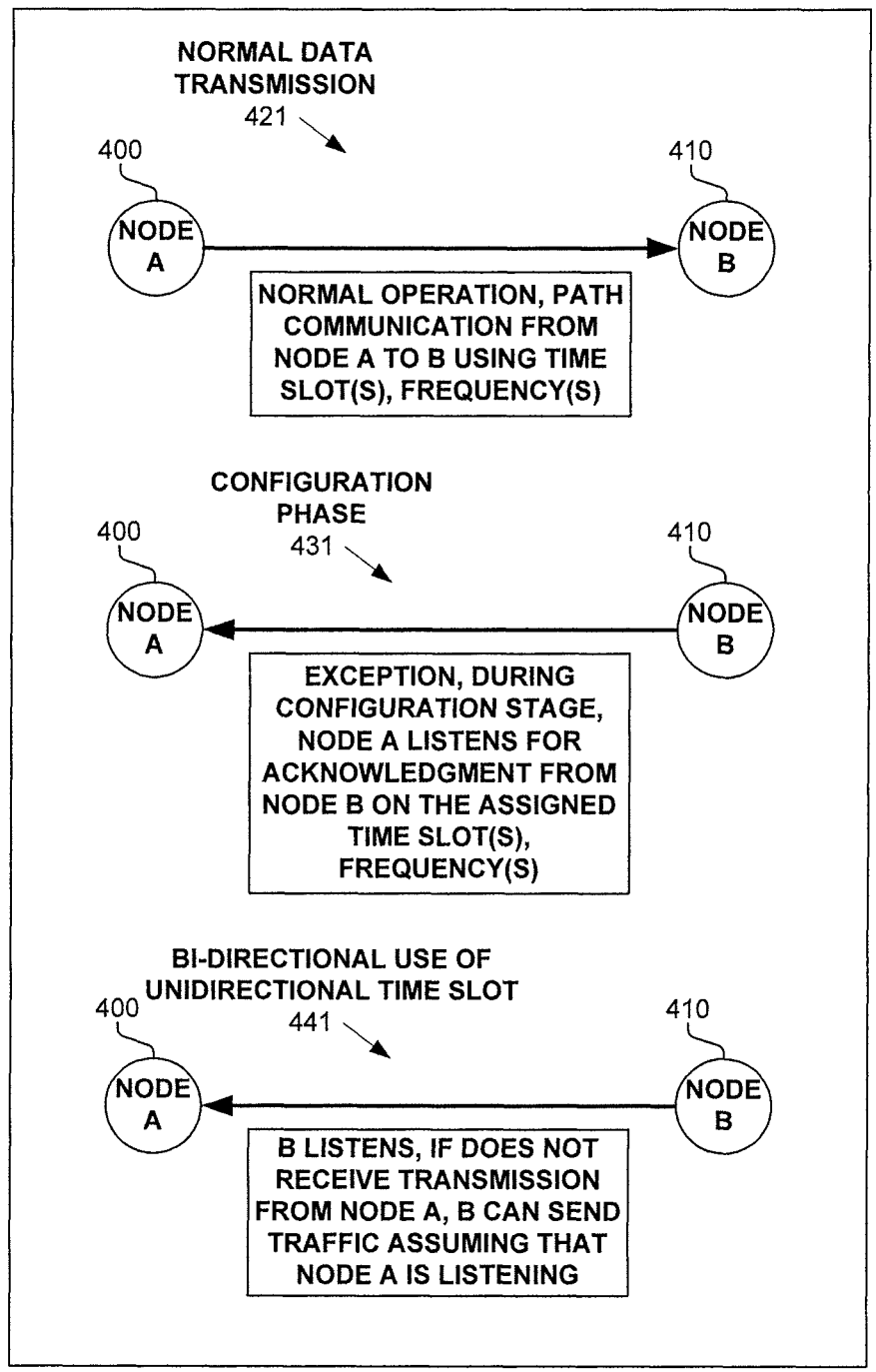
FIG. 4 illustrates data transmission according to one embodiment.

FIG. 4 illustrates different communication of information performed in one embodiment. At top of FIG. 4 is shown a normal data transmission (421) across a one-way path from node A (400) to node B (410) performed in one embodiment. Node A (400) communicates information to node B (410) using one or more predetermined time slots and one or more frequencies. In other words, node A (400) is configured to send, and node B (410) is configured to listen during these one or more predetermined time slots and at the corresponding one or more frequencies.

Next, illustrated is communications during a configuration phase (431) across a one-way path from node A (400) to node B (410) performed in one embodiment. Prior to activating a forwarding path between node A (400) to node B (410), node A (400) listens during the time slot(s) and on the corresponding one or more frequencies that is in the process of being configured for sending traffic from node A (400) to node B (410). However, because node A (400) does not activate this one-way path prior to receiving an acknowledgement from node B (410), these time slot(s)/frequency(s) are available for communicating an acknowledgement message in the reverse direction, that being from node B (410) to node A (400).

Next, illustrated is communications (441) across a one-way path between node A (400) and node B (410) performed in one embodiment. In one embodiment, when node A (400) does not have traffic to send to node B (410) during one or more predetermined time slot(s)/frequency(s), node B (410) will detect this as it will listen and not receive a message from node A (400). In one embodiment after waiting a predetermined wait time, node B (410) stops listening and node A (400) starts listening, and node B (410) then can send information over these time slot(s)/frequency(s) to node A (400), despite it being configured as a one-way path from node A (400) to node B (410).

Figure 5:
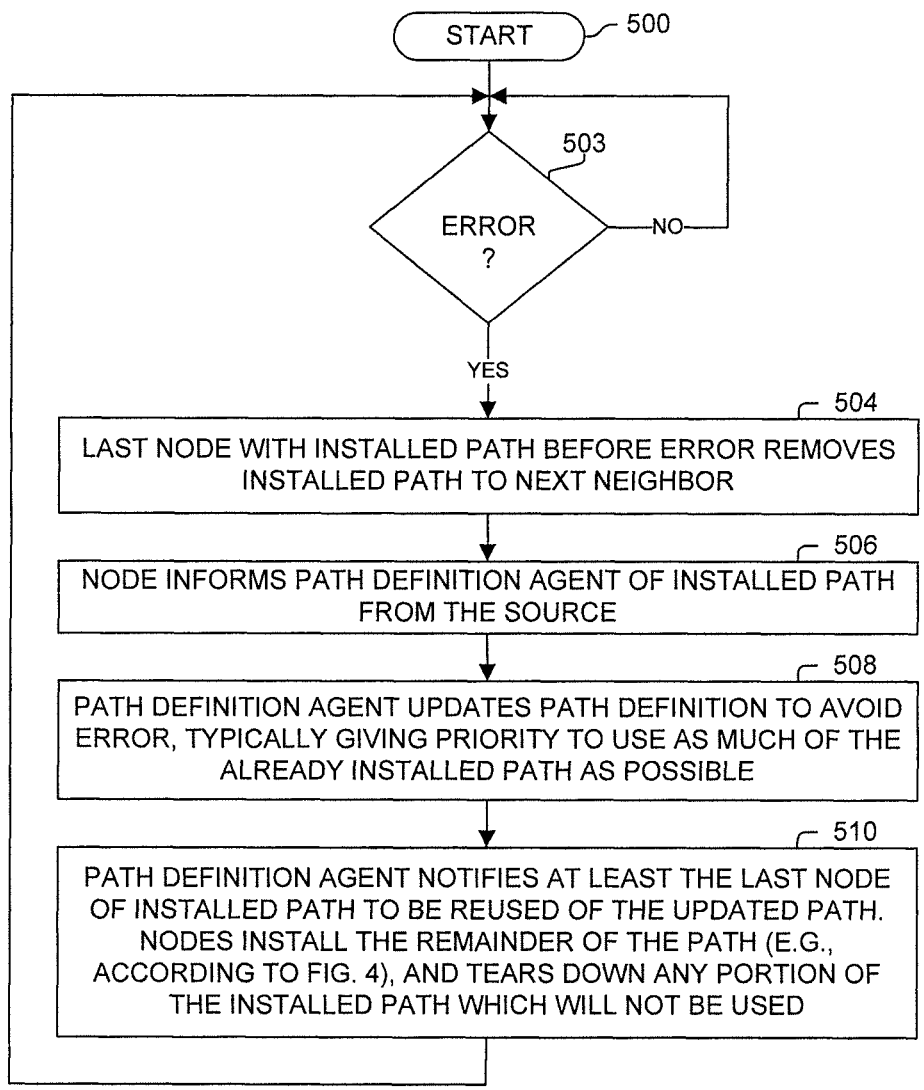
FIG. 5 illustrates a process according to one embodiment.

FIG. 5 illustrates a process performed in one embodiment, such as, but not limited to, encountering an error condition when establishing a communications link. Processing begins with process block 500. As determined in process block 503, while there is no error in establishing a communications path through a deterministic network (e.g., wireless deterministic network) through a sequence of nodes, processing remains at process block 503. In response to an error being detected in the processing of process block 503, processing proceeds to process block 504. The last node with the installed (but not used) path before the error location (e.g., the next portion of the path cannot be established to the next node in the path determined by the path definition agent(s)) removes the installed (but not used) forwarding information for the path. In process block 506, this node informs the path definition agent(s) of the error and that the portion of the path that is installed is that from the source node to this node. In process block 508, the path definition agent(s) updates the path definition to avoid the error, and typically using as much as the installed portion of the path as possible (e.g., especially in a resource constrained wireless deterministic network). In process block 510, the path definition agent(s) notifies at least the last node of the installed path to be reused of the updated path. Nodes install the remainder of the path (e.g., according to at least a portion of the flow diagram of FIG. 4 or otherwise described herein), with any portion of the already installed path that is not part of the updated path being torn down. Processing returns to process block 503 to monitor if this path update installation and activation (or another path configuration) fails.

Figure 6:
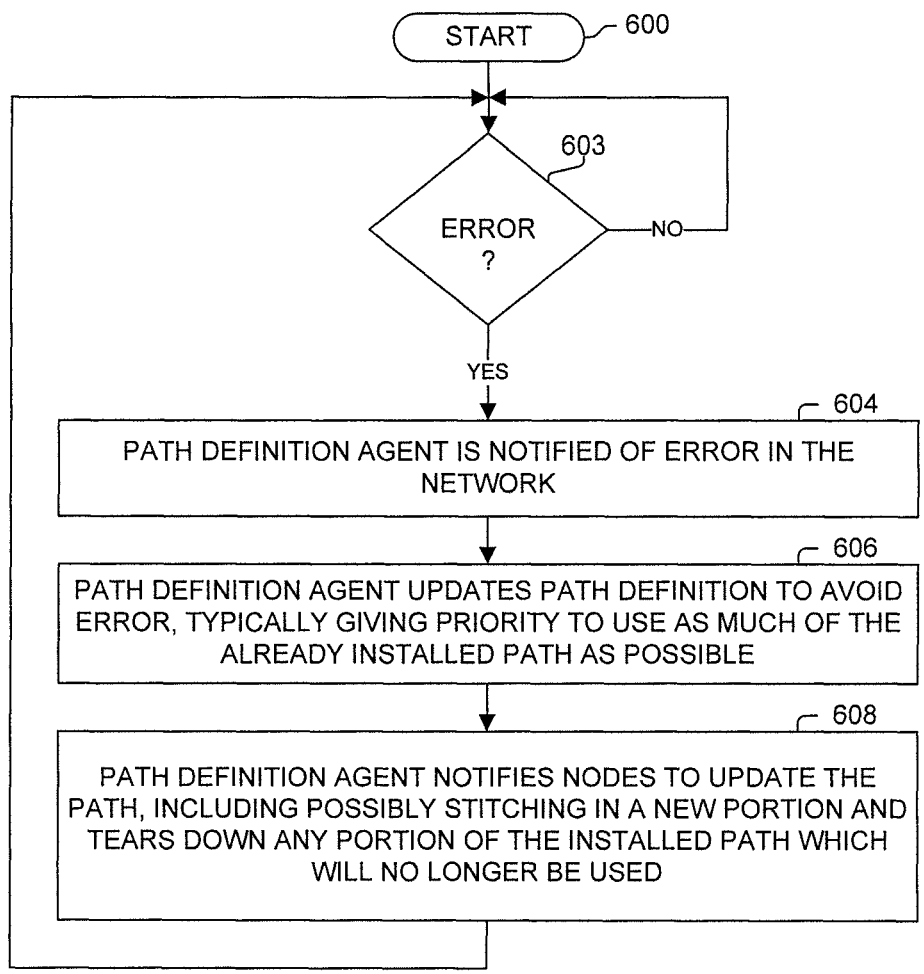
FIG. 6 illustrates a process according to one embodiment.

FIG. 6 illustrates a process performed in one embodiment, such as, but not limited to, encountering an error condition during operation of an established communications link. Processing begins with process block 600. As determined in process block 603, while there is no error with a communications path through a deterministic network (e.g., wireless deterministic network) through a sequence of nodes, processing remains at process block 603. In response to an error being detected in the processing of process block 603, processing proceeds to process block 604, wherein a path definition agent is notified of the error in the network. Especially as establishing a communications path can be a relatively expensive endeavor, in one embodiment in process block 604, the path definition agent attempts to reuse as much as the established communications path as possible, and determines an updated path. In process block 608, the path definition agent notifies the nodes required to update the new path, typically stitching in a new portion to avoid the problem, while tearing down any portion of the installed path which will no longer be used. In one embodiment for the nodes where the new path stitching/insertion occurs, the incoming slot(s) are mapped to the new outgoing slot(s) of the same Path ID to cause packet traffic to traverse the new segment at one node, and to rejoin the remaining portion of the previous portion at another node when rejoining at an intermediate node. When the new segment begins at the source node, the outgoing slot(s) for the Path ID are updated (as there are no incoming slots). When the new segment ends at the destination node, the incoming slot(s) for the Path ID are updated (as there are no outgoing slots). Processing of the flow diagram of FIG. 6 returns to process block 603 to react to any error conditions.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
communicating, by a first node in a wireless deterministic network to a second node in the wireless deterministic network, configuration information identifying a destination-facing path portion of a particular one-way path traversing from a source node to a destination node within the wireless deterministic network, with the destination-facing portion including a path traversing from the second node over one or more additional nodes to the destination node over which to forward packets received over a first portion of the particular one-way path from the source node to the second node, and with said configuration information nation including a particular time slot for the second node to receive packets being sent over the particular one-way path; with the particular one-way path including the source node, the destination node, the first node, the second node, and said one or more additional nodes; and
receiving, by the first node from the second node, an acknowledgement message in the particular time slot that the destination-facing portion of the particular one-way path was configured and activated.

2. The method of claim 1, wherein said configuration information includes a particular frequency for the second node to receive packets being sent over the particular one-way path; and wherein the first node said receives the acknowledgement message on the particular frequency.

3. The method of claim 2, comprising: listening, by the first node after waiting a nonzero predetermined wait time after the beginning of the particular time slot that allows the second node to communicate with the first node if the first node does not send information during the nonzero predetermined wait time, for the acknowledgement message.

4. The method of claim 1, wherein said configuration information includes time slot allocation information for communicating among nodes in the destination-facing path.

5. The method of claim 4, wherein said configuration information includes frequency allocation information for communicating among nodes in the destination-facing path.

6. The method of claim 5, wherein said configuration information was determined by a path definition agent and communicated to the first node by going through nodes of the first portion of the particular one-way path from the source node to the first node.

7. The method of claim 1, comprising:
receiving, by the first node from a prior node in the first portion of the particular one-way path a specific time slot for the first node to receive packets being sent over the particular one-way path; and
installing, by the first node, the specific time slot for receiving packets being sent over the particular one-way path.

8. The method of claim 7, comprising: activating, by the first node in response to said receiving the acknowledgement message, forwarding information for forwarding packets to the second node over the particular one-way path.

9. The method of claim 8, wherein said configuration information was determined by a path definition agent and communicated to the first node by going through nodes of the first portion of the particular one-way path from the source node to the first node.

10. The method of claim 1, comprising: listening, by the first node after waiting a nonzero predetermined wait time after the beginning of the particular time slot that allows the second node to communicate with the first node if the first node does not send information during the nonzero predetermined wait time, for the acknowledgement message.

11. A method, comprising:
communicating, by a first node in a wireless deterministic network to a second node in the wireless deterministic network, configuration information identifying a destination-facing path portion of a particular one-way path traversing from a source node to a destination node within the wireless deterministic network, with the destination-facing portion including a path traversing from the second node to the destination node over which to forward packets received over a first portion of the particular one-way path from the source node to the second node, and with said configuration information including a particular time slot for the second node to receive packets being sent over the particular one-way path; and wherein said configuration information was determined by a path definition agent and communicated to the first node by going through nodes of the first portion of the particular one-way path from the source node to the first node; with the particular one-way path including the source node, the destination node, and the first node, and with the destination-facing path portion of the particular one-way path including the second node; and
in response to not receiving by the first node from the second node an acknowledgement message or receiving an error message, the first node communicating to the path definition agent a notification of the failure to install and activate the destination-facing portion of the particular one-way path;
receiving, by the first node, new configuration information identifying a new destination-facing portion for reaching the destination node, with the new destination-facing portion including a path traversing from a third node to the destination node without traversing the second node over which to forward packets received over the first portion of the particular one-way path, and with said new configuration information including a new particular time slot for the third node to receive packets being sent over the particular one-way path, with the new destination-facing path portion of the particular one-way path including the third node; and
receiving, by the first node from the third node, an acknowledgement message in the new particular time slot that the new destination-facing portion of the particular one-way path was configured and activated.

12. The method of claim 11, comprising:
receiving, by the first node from a prior node in the first portion of the particular one-way path a specific time slot for the first node to receive packets being sent over the particular one-way path; and
installing, by the first node, the specific time slot for receiving packets being sent over the particular one-way path.

13. The method of claim 12, comprising: uninstalling, by the first node, the specific time slot for receiving packets being sent over the particular one-way path in response to the path definition agent determining a new one-way path traversing from the source node to the destination node within the wireless deterministic network over one or more nodes in the first portion but not including the first node.

14. A first node, comprising:
one or more processing elements;
memory;
one or more wireless interfaces configured to send and receive packets; and
wherein the first node is configured to communicate with a second node in a wireless deterministic network, including communicating configuration information identifying a destination-facing path portion of a particular one-way path traversing from a source node to a destination node within the wireless deterministic network, with the destination-facing portion including a path traversing from the second node to the destination node over which to forward packets received over a first portion of the particular one-way path from the source node to the second node, and with said configuration information including a particular time slot for the second node to receive packets being sent over the particular one-way path; and
wherein the particular one-way path includes the source node, the destination node, the first node, and the second node; and
wherein the first node is configured to receive from the second node an acknowledgement message in the particular time slot that the destination-facing portion of the particular one-way path was configured and activated.

15. The first node of claim 14, wherein said configuration information includes a particular frequency for the second node to receive packets being sent over the particular one-way path; and wherein the first node said receives the acknowledgement message on the particular frequency.

16. The first node of claim 15, wherein the first node is configured to listen after waiting a nonzero predetermined wait time after the beginning of the particular time slot that allows the second node to communicate with the first node if the first node does not send information during the nonzero predetermined wait time, for the acknowledgement message.

17. The first node of claim 14, wherein said configuration information includes time slot allocation information for communicating among nodes in the destination-facing path.

18. The first node of claim 17, wherein said configuration information was determined by a path definition agent and communicated to the first node by going through nodes of the first portion of the particular one-way path from the source node to the first node.

19. The first node of claim 14, wherein the first node is configured to:
receive from a prior node in the first portion of the particular one-way path a specific time slot for the first node to receive packets being sent over the particular one-way path, and to install the specific time slot for receiving packets being sent over the particular one-way path.

* * * * *

UNITED STATES PATENT AND TRADEMARK OFFICE
CERTIFICATE OF CORRECTION

PATENT NO.       : 9,258,097 B2
APPLICATION NO.  : 13/954297
DATED            : February 9, 2016
INVENTOR(S)      : Wetterwald et al.

Page 1 of 1

It is certified that error appears in the above-identified patent and that said Letters Patent is hereby corrected as shown below:

In The Specification

Col. 3, line 46, replace "deteiministic" with -- deterministic --

In The Claims

Col. 11, Claim 1, line 36, replace "information nation including" with -- information including --

Signed and Sealed this
Third Day of May, 2016

Michelle K. Lee
*Director of the United States Patent and Trademark Office*